United States Patent [19]

Katzin

[11] Patent Number: 5,150,315
[45] Date of Patent: Sep. 22, 1992

[54] ELECTRICAL RESISTOR VALUE DECODING CALCULATOR

[76] Inventor: Lawrence F. Katzin, 324 Westridge Dr., Raleigh, N.C. 27609

[21] Appl. No.: 544,736

[22] Filed: Jun. 27, 1990

Related U.S. Application Data

[63] Continuation-in-part of Ser. No. 239,514, Sep. 1, 1988, abandoned.

[51] Int. Cl.$^5$ .............................................. G06F 3/00
[52] U.S. Cl. .............................................. 364/709.02
[58] Field of Search ............... 364/709.12–709.16, 364/715.01, 709.01, 709.02

[56] References Cited

U.S. PATENT DOCUMENTS

| | | | |
|---|---|---|---|
| 4,092,527 | 5/1978 | Luecke | 364/709.1 |
| 4,122,526 | 10/1978 | Dlugos et al. | 364/715.05 |
| 4,156,912 | 5/1979 | Shigeta et al. | 364/443 |
| 4,257,306 | 3/1981 | Laflamme | 84/485 R |
| 4,280,121 | 7/1981 | Crask | 364/706 |
| 4,336,530 | 6/1982 | Korke et al. | 340/712 |
| 4,439,757 | 3/1984 | Gross et al. | 341/23 |
| 4,500,872 | 2/1985 | Huang | 400/110 |
| 4,647,911 | 3/1987 | Maegawa et al. | 364/709.14 |

OTHER PUBLICATIONS

Tracton, Programs in Basic for Electronic Engineers, Technicians, and Experimenters, pp. 66–74, TAB Books Inc., Blue Ridge Summitt Pa., 1979.

*Primary Examiner*—Dale M. Shaw
*Attorney, Agent, or Firm*—Rosenthal & Putterman

[57] ABSTRACT

An electronic hand-held resistor value decoding calculator is disclosed. The calculator includes a keypad comprising a keypad housing and an array of ten manually operated keypad switches for receiving input signals. Each of the keypad switches has a numeral from zero through nine associated therewith and is uniquely colored so as to correspond to the colors of the International Resistor Color Code. The calculator also includes an ALU operatively connected to the keypad switches for performing mathematical calculations on the input signals for determining the value of a resistor. A display is operatively connected to the ALU for displaying the computational result of the mathematical computations on the input signals. The keypad switches are adapted to receive three input signals, each of the input signals being a single keystroke and each of the keystrokes representing a single color band on the resistor.

In an alternate embodiment, the colors of the International Resistor Color Code appear on the calculator housing immediately adjacent and in operative association with the corresponding key. Similarly, a template having the colors of the International Resistor Color Code thereon and adapted to overlie the keypad housing is also disclosed.

3 Claims, 4 Drawing Sheets

ELECTRICAL RESISTOR VALUE DECODING CALCULATOR

This application is a continuation-in-part of patent application serial number 239,514 filed Sept. 1, 1988, now abandoned.

FIELD OF THE INVENTION

This invention relates generally to the field of specialty calculators and more specifically to a calculator for calculating the value of electrical resistors.

BACKGROUND OF THE INVENTION

Electrical resistors have long been employed as components used in most types of electrical appliances and are found in a variety of values ranging from ohms to millions of ohms. However, without indicia indicating the value of a particular resistor, they are indistinguishable from one another when observed visually. Thus, an international system indicating resistor values was derived which consists of four colored bands which are printed around one end of the resistor. The color code is as follows:

| | |
|---|---|
| 0-Black | 5-Green |
| 1-Brown | 6-Blue |
| 2-Red | 7-Violet |
| 3-Orange | 8-Grey |
| 4-Yellow | 9-White |

According to the convention established by the code, the first two bands correspond to resistor value, the third corresponds to the multiplier and the fourth to the manufacturing tolerance. Thus, a resistor displaying the band sequence of red, green, yellow would have a value of 250,000 ohms. For the purposes of this invention, the fourth color band will not be discussed.

However, the color code is sometimes confusing and engineering students and even experienced engineers can experience difficulty in properly identifying the value of a particular resistor.

In response to the foregoing problem, various mnemonic devices have been developed in order to assist persons in memorizing the sequence of colors which correspond to the numerals 0 through 9. While somewhat effective, these methods still include considerable potential for error.

It is, therefore, an object of the present invention to provide a resistor value calculator that increases the accuracy with which a resistor value can be identified.

It is another object of the present invention to provide a resistor calculator with which a resistor value can be determined quickly.

It is a further object of the present invention to provide a resistor calculator that aids the user in developing an association between the resistor value color code and the corresponding numerals.

SUMMARY OF THE INVENTION

The foregoing objects are accomplished by providing an electronic hand-held pocket-sized calculator for aiding in the determination of the value of electrical resistors. The calculator includes a keypad comprising a keypad housing and an array of ten manually operated keypad switches for receiving input signals. Each of the keypad switches has a numeral from zero through nine associated therewith and being uniquely colored so as to correspond to the colors of the International Resistor Color Code. The calculator also includes calculating means operatively connected to the keypad switches for performing mathematical calculations on the input signals for determining the value of a resistor. A display is operatively connected to the calculating means for displaying the computational result of the mathematical computations on the input signals. The keypad switches are adapted to receive three input signals, each of the input signals being a single keystroke and each of the keystrokes representing a single color band on the resistor.

In a second embodiment of the invention a template having a plurality of cutout portions defining openings, and wherein the openings correspond to the position of the keypad switches on the keypad housing is provided. The template is adapted to removably overlie the keypad housing in contacting relation therewith and to lie between the keypad switches. Each color of the International Resistor Color Code is positioned on the template in operative association with each opening in corresponding relation to each of the respective ten manually operated keypad switches bearing the numeral corresponding thereto.

In a third embodiment of the invention each color of the International Resistor Color Code is positioned on the keypad housing immediately adjacent and in operative association with the keypad switch bearing the numeral corresponding thereto.

BRIEF DESCRIPTION OF THE DRAWINGS

Some of the features and advantages of the invention having briefly been described, others will appear from the detailed description which follows, when taken in connection with the accompanying drawings in which.

DETAILED DESCRIPTION OF THE PREFERRED EMBODIMENTS

While the present invention will be described more fully hereinafter with reference to the accompanying drawings, in which particular embodiments are shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 1:
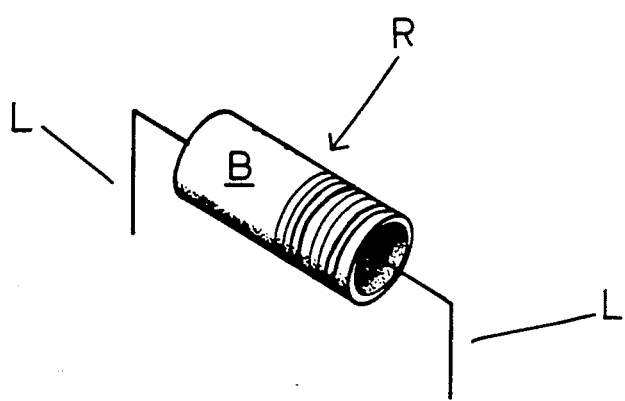
FIG. 1 is a perspective view of an electrical resistor and showing the four colored bands which indicate the resistor value and the manufacturing tolerance.

Referring now to the drawings and particularly to FIG. 1, which illustrates a typical resistor generally indicated at R that comprises a body section B (generally made from carbon) and lead wires L connected thereto and extending outwardly from each and thereof. The resistor also includes four colored bands that encircle one of its ends that indicate the resistor value. According to the convention of the International Resistor Color Code, the first two bands correspond to the resistor value and the third represents the multiplier digit. The color to numeral correspondence has been explained above.

Figure 2:
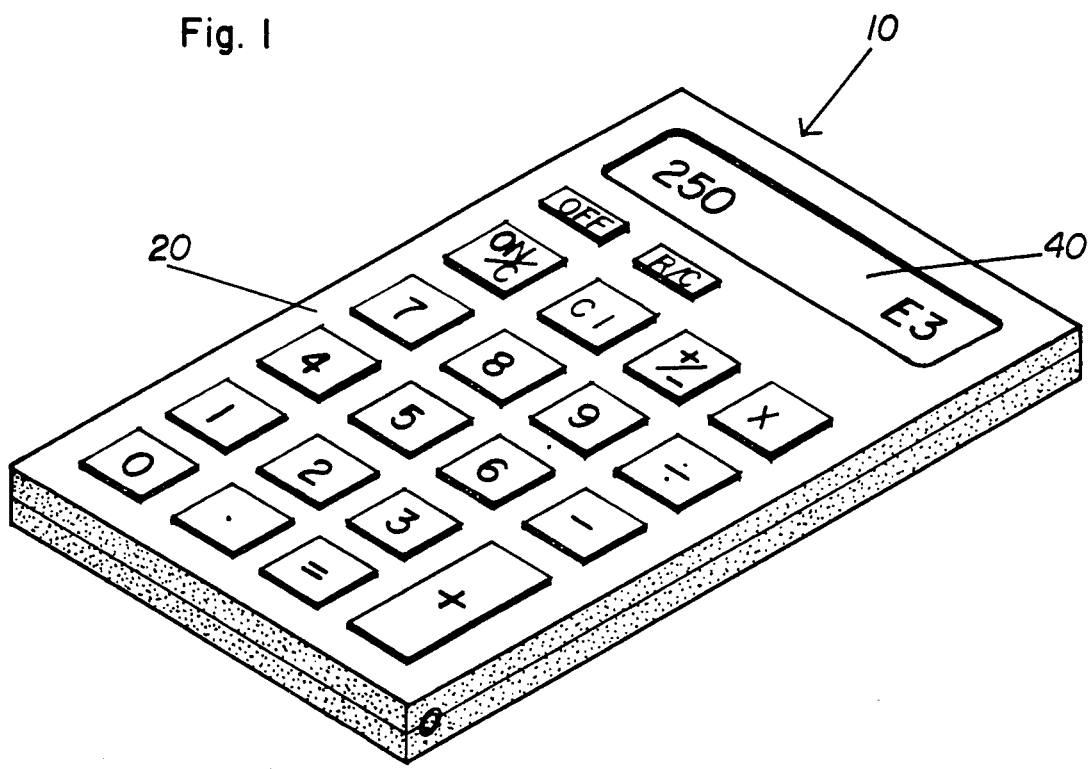
FIG. 2 is a perspective view of a resistor value decoding calculator including a keypad having colored keys and optional resistor calculator mode enabling (RC/on) switch.
Figure 3:
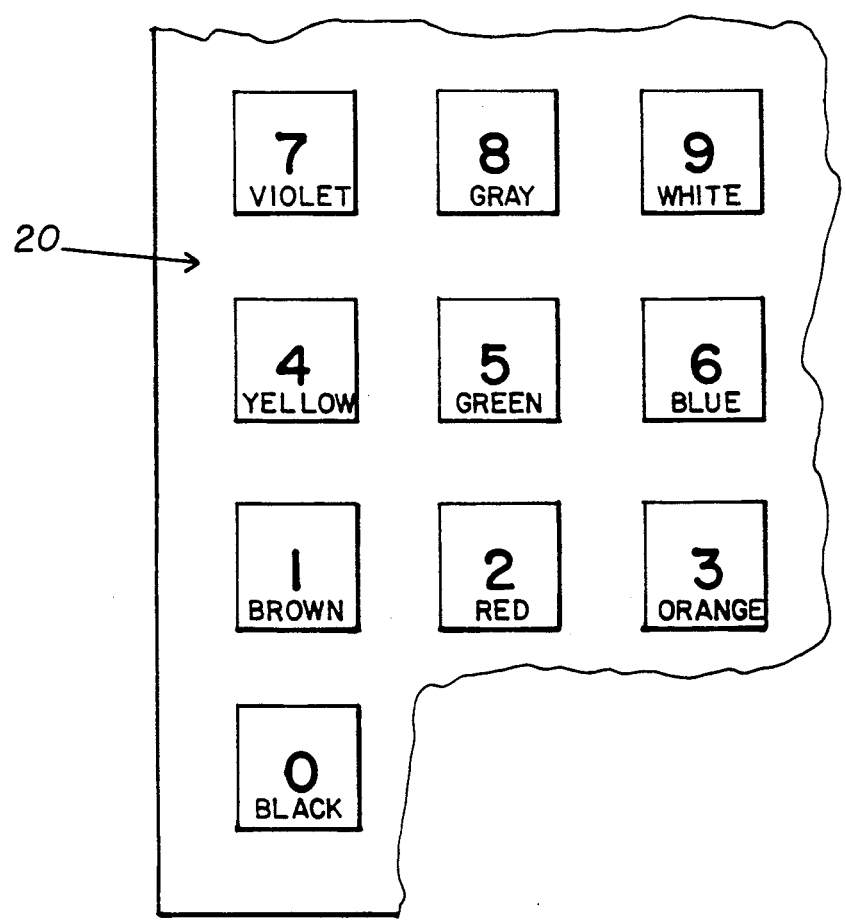
FIG. 3 is an enlarged plan view of the keypad of FIG. 2 illustrating the numeral to color correspondence.
Figure 4:
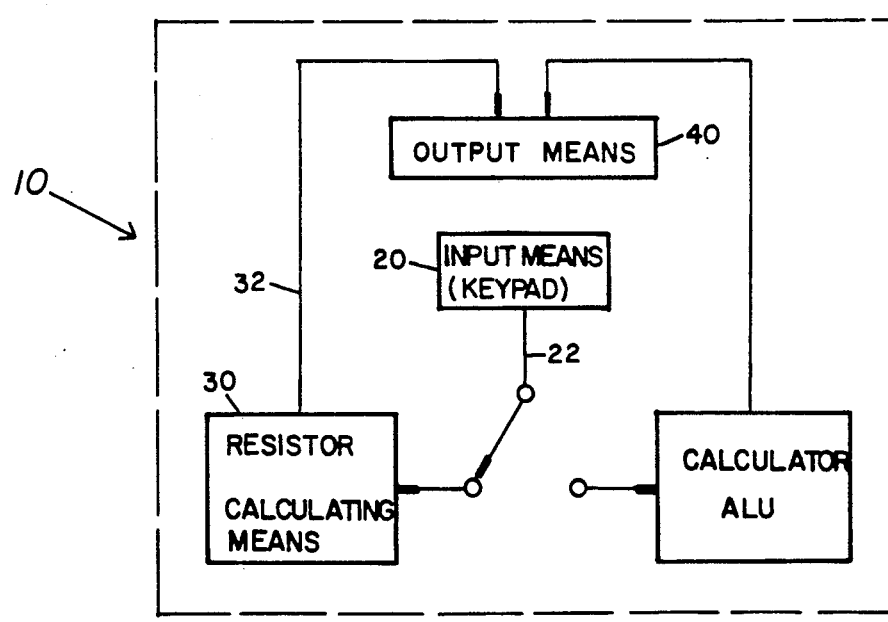
FIG. 4 is a block diagram of the apparatus of the present invention for calculating resistor values.

Referring now to FIGS. 2, 3 and 4, the resistor value decoding calculator of the present invention is illustrated there in detail as being incorporated into a conventional multifunction calculator, generally indicated at 10. The resistor value calculator comprises an input means 20, a calculating means 30, and a display means 40. However, it will be noted that the calculator may easily be incorporated into a variety of other devices such as computer keyboards, typewriter keyboards and the like.

The input means 20 includes a keypad housing and an array of manually operated keypad switches or keys. The input means is adapted to receive three input signals, each of the input signals being a single keystroke and each of the keystrokes representing a single color band on the resistor. The input means then converts the input signals into a corresponding output which may be electrical, optical and the like. As illustrated in FIGS. 2 and 3 the array includes 10 conventional calculator type keypad switches each of which has a numeral from 0 through 9 associated therewith. In addition, each switch is uniquely colored so as to correspond to the International Resistor Color Code. Thus, the switch numeral/color correspondence is as follows:

| | |
|---|---|
| 0-Black | 5-Green |
| 1-Brown | 6-Blue |
| 2-Red | 7-Violet |
| 3-Orange | 8-Grey |
| 4-Yellow | 9-White |

It will also be noted that the input means could also be a laser scanner or a speech recognition system where the user would recite the colors, video, and the like. In any of the just mentioned cases the technology for implementing the input means is well known to those skilled in the art.

The calculator also includes a calculating means 30 for performing mathematical calculations on the input signals for determining the value of a resistor. As shown in FIG. 4, the calculating means 30 is a separate means from the arithmetic logic unit (ALU) used in the calculator. However, the calculating means could easily be incorporated into the main calculator ALU. The technology associated with the design and production of the calculating means is well known to circuit designers and further discussion on this component is not deemed necessary. The calculating means 30 is operatively connected to the keypad switches 20 by line 22 and is adapted to receive input signals such as electrical or optical signals, from the keypad switches when they are activated.

The calculator of the present invention also includes a display means 40 operatively connected to the calculating means by line 32 for displaying or otherwise outputting the computational results of the mathematical computation on the input signals. In the illustrated embodiment, the output means 40 is a conventional display device such as liquid crystal (LCD) or a light emitting diode (LED) display. However, there are circumstances where it may be desired to output the computational results representing the resistor value in other than a visually observable form. For example, the output could be sent directly to a computer or other industrial/manufacturing apparatus or a combination thereof for direct use in automated production processes, or could be sent to a speech synthesizer.

In operation, the user of the calculator would examine the resistor to be identified and would identify the colors of the bands that correspond to the resistor value. Next, the user enters the resistor value by depressing, in proper order, the keypad switches that correspond to the colors of the bands on the resistor. Lastly, the user would depress the R/C (resistor calculator) keypad switch which activates the calculating means 30. The calculating means 30 then performs the required computation and the result is output and is transmitted on line 32 to the display means 40 where it is displayed for the user in a visually observable form.

In an alternate embodiment of the invention, a conventional multifunction calculator could be used as a resistor value decoding calculator. Specifically, the operator, in order to calculate the value of a given resistor, would depress the keypad switches corresponding to the first two color bands followed by depressing the keypad switch that activates the exponential notation and then depressing the keypad switch corresponding to the third color band, at which time the resistor value would be displayed at the display means in exponential format as shown in the FIGS. It is understood that depressing the R/C or exponential keyswitch or its equivalent corresponds to activation of the calculating means. Similarly, all three color bands could be entered prior to activating the exponential or R/C keypad switch.

Figure 5:
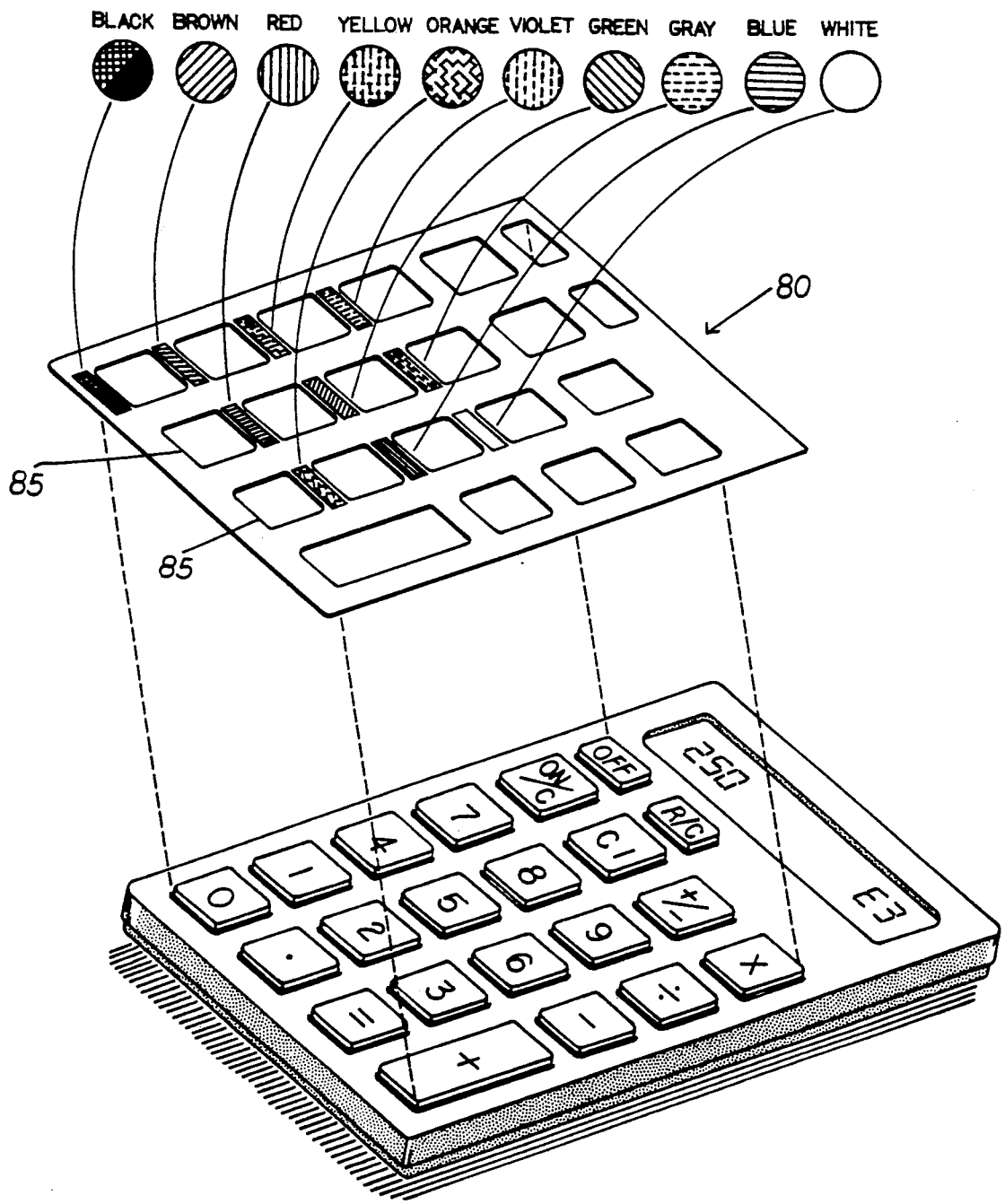
FIG. 5 is a perspective view of a resistor value decoding calculator of the present invention including a template adapted to overlie the keypad portion of the calculator. The colors of the International Resistor Color Code are printed on the template immediately adjacent the opening corresponding to the respective numeric key.

A second embodiment of the resistor value calculator is illustrated in FIG. 5. The keypad switches are not colored to correspond with the colors of the International Resistor Color Code. Instead, a template means or template 80 having a plurality of cutout portions defining openings 85 is provided. The openings correspond to the position of the keypad switches on the keypad housing. The template 80 is adapted to removably overlie the keypad housing in contacting relation therewith and to lie between the keypad switches. In addition, each color of the International Resistor Color Code is positioned on the template immediately adjacent and in operative association with each opening in corresponding relation to each of the respective ten manually operated keypad switches corresponding thereto.

Figure 6:
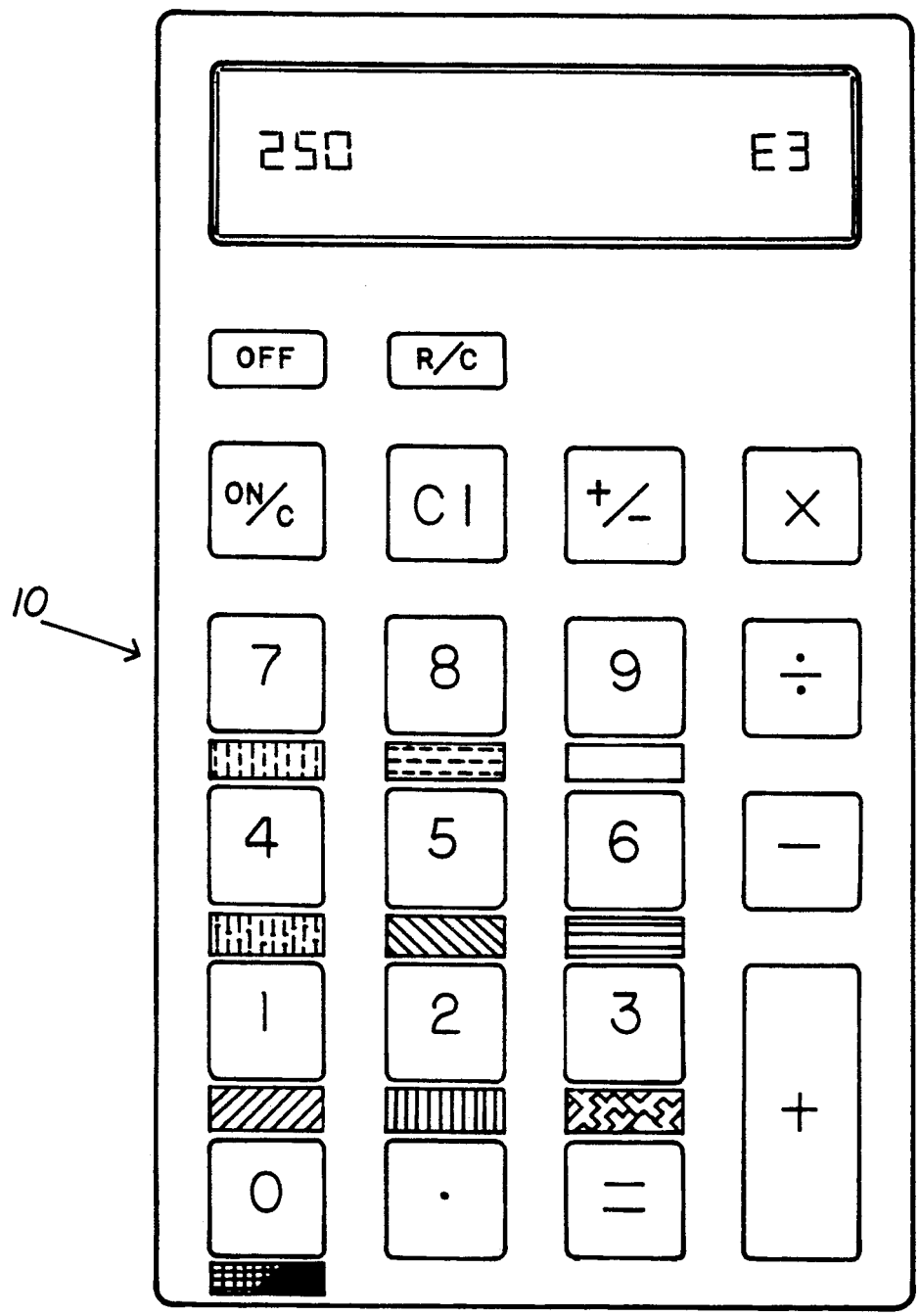
FIG. 6 is a plan view of another embodiment of the resistor value decoding calculator of the present invention. The colors of the International Resistor Color Code are printed on the calculator housing and each color of the International Resistor Color Code is positioned on the calculator so as to be uniquely associated with the corresponding numeric input key.

A third embodiment of the resistor value calculator is illustrated in FIG. 6. The calculator is essentially identical to that illustrated in FIGS. 1 through 4, except that each color of the International Resistor Color Code is positioned on the keypad housing immediately adjacent and in operative association with the keypad switch bearing the numeral corresponding thereto. It is understood that although the second and third embodiments show the colors positioned above each of the keypad switches, they can just as effectively be positioned on any of the sides immediately adjacent and in operative association the respective key.

The operation of the second and third embodiments discussed above are essentially identical to the first embodiment and the reader is referred to the portion of the specification for a detailed discussion covering the operation of the calculator.

In each of the foregoing embodiments of the invention, it will be noted that the colors of the International Resistor Color Code must be positioned on the keypad switch, the keypad housing or the template. This can be accomplished by any one of a number of methods including color printing, lithography, adhesive labels, or any one of a large variety of well-known methods well known to those skilled in the art.

The foregoing embodiments and examples are to be considered illustrative, rather than restrictive of the invention, and those modifications which come within the meaning and range of equivalence of the claims are to be included therein.

That which is claimed is:

1. An electronic hand-held pocket-sized calculator for aiding in the determination of the value of electrical resistors of the type having resistor value color bands and comprising:

a keypad comprising a keypad housing and an array of ten manually operated keypad switches for receiving input signals, each of said keypad switches having a numeral from zero through nine associated therewith and being uniquely colored so as to correspond to the colors of the International Resistor Color Code;

said array of manually operated keypad switches being adapted to receive three input signals, each of said input signals being a single keystroke and each of said keystrokes representing a single color band on the resistor;

calculating means operatively connected to said keypad switches for performing mathematical calculations on the input signals for determining the value of a resistor; and a display means operatively connected to said calculating means for displaying the computational result of the mathematical computations on the input signals, whereby the value of a resistor is calculated and displayed after the three input signals corresponding to the three resistor color bands have been entered.

2. A resistor calculator according to claim 1 wherein said display means comprises a liquid crystal display.

3. A resistor calculator according to claim 2 wherein said display means includes means for displaying two digits and an exponent.

* * * * *